(12) United States Patent  
Günther (10) Patent No.: US 10,723,234 B2
(45) Date of Patent: Jul. 28, 2020

(54) BATTERY HOUSING (71) Applicant: Kirchhoff Automotive Deutschland GmbH, Attendorn (DE)

(72) Inventor: Alexander Günther, Olpe (DE)

(73) Assignee: KIRCHHOFF AUTOMOTIVE DEUTSCHLAND GMBH, Attendorn (DE)

(*) Notice: Subject to any disclaimer, the term of this patent is extended or adjusted under 35 U.S.C. 154(b) by 0 days.

(21) Appl. No.: 16/473,990

(22) PCT Filed: Mar. 1, 2018

(86) PCT No.: PCT/EP2018/055038
§ 371 (c)(1),
(2) Date: Jun. 26, 2019

(87) PCT Pub. No.: WO2018/158363
PCT Pub. Date: Sep. 7, 2018

(65) Prior Publication Data
US 2019/0337402 A1    Nov. 7, 2019

(30) Foreign Application Priority Data
Mar. 2, 2017    (DE) .................... 10 2017 104 360

(51) Int. Cl.
*B60K 1/04*       (2019.01)
*B60L 50/60*      (2019.01)
(Continued)

(52) U.S. Cl.
CPC ............... *B60L 50/66* (2019.02); *B60K 1/04* (2013.01); *H01M 2/1077* (2013.01);
(Continued)

(58) Field of Classification Search
CPC .......... B60K 11/04; B60K 11/08; B60K 1/00; B60K 1/04; B60K 11/02
See application file for complete search history.

(56) References Cited

U.S. PATENT DOCUMENTS 8,074,757 B2 * 12/2011 Wagner ................. B60R 16/04
                                                    180/68.5
10,424,770 B2   9/2019 Günther
(Continued)

FOREIGN PATENT DOCUMENTS

DE    102009058809 A1    6/2011
DE    102011003535 A1    8/2012
(Continued)

OTHER PUBLICATIONS

U.S. Appl. No. 16/473,996, filed Jun. 26, 2019 (Günther), applicant Kirchhoff Automotive Deutschland GmbH. Per USPTO waiver of Rule 1.98(a)(2)(iii) requirement.
(Continued)

*Primary Examiner* — John D Walters
*Assistant Examiner* — James J Triggs
(74) *Attorney, Agent, or Firm* — Polson Intellectual Property Law, PC; Margaret Polson (57) ABSTRACT

A battery housing for an electric-motor-driven vehicle comprising a tub-like housing part having a plurality of support elements arranged at a distance from each other, and having a bottom part supported on the support elements. The bottom part is convexly curved toward the outside of the housing part in the longitudinal and/or transverse extent in the span of the bottom part between each pair of adjacent support elements arranged at a distance from each other, and is connected in the direction of the curvature to the support elements between which the span of the arch extends.

14 Claims, 6 Drawing Sheets

(51) Int. Cl.
  *H01M 10/613* (2014.01)
  *H01M 10/625* (2014.01)
  *H01M 10/6554* (2014.01)
  *H01M 2/10* (2006.01)

(52) U.S. Cl.
  CPC ....... *H01M 2/1083* (2013.01); *H01M 10/613* (2015.04); *H01M 10/625* (2015.04); *H01M 10/6554* (2015.04); *H01M 2220/20* (2013.01)

(56) References Cited

U.S. PATENT DOCUMENTS

| | | | | |
|---|---|---|---|---|
| 2013/0252059 | A1* | 9/2013 | Choi | B29C 70/20 429/100 |
| 2016/0240325 | A1* | 8/2016 | Tajima | H01G 11/82 |
| 2016/0248060 | A1* | 8/2016 | Brambrink | B60K 1/04 |
| 2018/0050607 | A1* | 2/2018 | Matecki | B60K 1/04 |
| 2019/0036092 | A1 | 1/2019 | Günther | |
| 2019/0229311 | A1 | 7/2019 | Günther | |
| 2019/0252741 | A1 | 8/2019 | Günther | |
| 2019/0259994 | A1 | 8/2019 | Günther | |
| 2019/0273231 | A1 | 9/2019 | Günther | |
| 2019/0381899 | A1 | 12/2019 | Günther | |

FOREIGN PATENT DOCUMENTS

| | | |
|---|---|---|
| DE | 102015111749 A1 | 1/2017 |
| EP | 2685523 A1 | 1/2014 |
| IE | 102011077349 A1 | 12/2012 |

OTHER PUBLICATIONS

International Search Report dated Sep. 7, 2018 in parent International application PCT/EP2018/055038.
International Preliminary Report on Patentability, Ch. II, dated Jun. 13, 2019 in parent International application PCT/EP2018/055038.

* cited by examiner

BATTERY HOUSING

BACKGROUND

Battery housing for an electric-motor-driven vehicle comprising a tub-like housing part having multiple support elements arranged at a distance from each other and having a bottom part supported on the support element for receiving one or more battery modules.

In electric-motor-driven vehicles such as, for example, passenger cars, trucks, forklift trucks or the like, battery modules are used as current storage. Such battery modules typically consist of multiple individual rechargeable batteries. Usually, these batteries are high-voltage batteries. A battery module can consist of one or more batteries. Certain requirements apply to the accommodation of the battery modules necessary for operating such a vehicle. They include also the behavior of such a battery housing in the case of an impact, the so-called crash performance, as well as the weight. In addition, the goal is to design the production of such battery housings to be as simple as possible.

Such battery housings as a general rule are produced from metal components, for example, aluminum or steel components, wherein battery housings which can be produced from different metals are also known. In order to accommodate the necessary number of battery modules, such battery housings can have quite large dimensions. Usually, they are accommodated in the area of the bottom of the vehicle. Battery housings having sizes of 2.0 m×1.5 m are not uncommon.

Such a battery housing comprises a tub-like housing part which can be provided, for example, by a frame or a frame structure and a bottom connected thereto or by a corresponding deep-drawn or bent component. A separator for subdivision is inserted in the tub structure. Each compartment is used for receiving typically one battery module.

Such a separator is formed by providing at least one longitudinal strut extending parallel to an edge and connected by its two ends in each case to the wall inner sides of the tub structure. For further subdivision, multiple transverse struts are provided, in each case arranged at a distance from one another and extending in parallel, wherein in each case two transverse struts are arranged facing one another with respect to the longitudinal axis of the longitudinal strut. The transverse struts are connected by one of their end faces to a side surface of the longitudinal strut and by the other end face to the inner wall of the tub structure or to another longitudinal strut. The connection of the struts to one another and the connection of the struts to the inner wall of the tub structure of the housing occurs by a joining process which, for these connections, typically involves welding connections.

DE 10 2015 111 749 A1 discloses a battery device for a vehicle operated at least partially electrically. This battery housing comprises an outer peripheral frame extending peripherally on the outside, which is closed on the bottom side by a stiffening plate for providing a bottom for setting battery modules. The space enclosed by the peripheral frame is subdivided by transverse bars and longitudinal supports which form a compartment. Under the stiffening wall forming the bottom, cooling channels are arranged in an underbody cavity provided for this purpose. The cooling channels contact the stiffening wall on the bottom side. By means of the insertion of connection profiles used as spacers, the battery housing is closed off on a bottom side by a bottom plate. Foam material can be arranged between the bottom plate and the cooling channels. The bottom plate itself is flat.

DE 10 2011 003 535 A1 discloses a bracing device for bracing individual battery modules. This device comprises two module supports arranged laterally to the battery modules to be connected together, which are connected and held together under pretensioning by an outwardly arched tensioning plate with resilient properties. The cavity which, due to the arching of the tensioning plate, lies opposite a bottom plate on which the battery modules are set is used for accommodating cooling channels. For evening out the pressure exerted by the tensioning plate and acting on the cooling channels, an elastic foam layer can be provided between the tensioning plate and the cooling channels. The tensioning plate is used for pressing the cooling channels against the bottom plate on which the battery modules are set, or, if no bottom plate is present, in order to press the cooling channels directly against the outside of the battery modules for improving the heat transfer.

Such battery housings are arranged commonly on the underbody of the car body bottom assembly due to the necessary accessibility and to their size. Vehicle-side bottoming out therefore acts directly on the battery housing. In order to prevent damage to the battery modules contained in such a battery housing, underbody linings and/or hoop guards are used, which extend over the battery housing. Such protective components are made of hard resistant materials, for example steel or also titanium. In each case, the weight of the vehicle is increased thereby. In addition, the remaining ground clearance is reduced by the additional attached protective components. Although protection of such a battery housing can also be provided by a flat plate when the ground clearance should not be restricted excessively. In such cases, titanium plates are used for the protection of the battery modules. Sandwich modules with an aluminum foam core are also used for the protection of battery housings. However, the cost of such components is quite high.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from the foregoing, an aspect of the present disclosure is to propose a battery housing which provides effective protection of the battery modules accommodated therein, which can nevertheless be produced cost effectively, and which does not significantly increase the height/thickness of the battery housing and thus does not significantly affect the ground clearance of a vehicle equipped with such a battery housing.

This is achieved by a battery housing comprising a tub-like housing part having multiple support elements arranged at a distance from each other and having a bottom part supported on the support element for receiving one or more battery modules, wherein the bottom part is convexly curved toward the outside of the housing part in its longitudinal and/or transverse extent in the span of the bottom part between two respective adjacent support elements arranged at a distance from one another, and the bottom part is connected in the direction of the curvature to the support elements between which the span of the arch extends.

In this battery housing, the bottom part is structured and provides the desired protection of the battery modules accommodated therein in the case of bottoming out. For this purpose, the bottom part is in each case curved monoaxially or else biaxially respectively between two support elements arranged at a distance from each other, namely convexly in the direction of the outside of the housing part. In this context, convex is understood to mean any design which is suitable for diverting an introduced force into the surrounding support elements. This also includes that the curvature can be designed to be "linear," i.e., to taper toward the outside of the housing part, in the manner of a pyramid or a truncated pyramid. Within the battery housing, the bottom part is thus curved between two support elements, by which curvature the distance from the inner side of the bottom part to a battery module contained in the battery housing is increased. A feature of this battery housing is that the support elements which are present in any case, such as, for example, frame parts and/or longitudinal and transverse struts, are designed for the mechanical protection of the battery modules arranged between these support elements. This applies to the support elements in the direction of their height (z direction) of the battery housing, but, in particular, in the plane (x-y plane), in order to protect the battery modules accommodated thereon in the case of a frontal or lateral impact. This stiffness of the support elements is used skillfully in this battery housing, in that the bottom part between two adjacent support elements is curved outward in a convex manner. The bottom part is braced on or connected to the support elements between which the span of the arch extends, namely by non-positive connection in the direction of the curvature and thus in x and/or y direction. The non-positive connection between a support element and the bottom part connected thereto can be implemented in a different manner. A non-positive connection can occur, for example, by using fasteners by which the bottom part is connected to the support elements. It is also possible for the bottom part to be connected to the support elements by firmly bonded joining, for example, by a welded connection. A non-positive connection of the bottom part to a support element exists when, in a marginal support element, the bottom part is braced thereto by its end face pointing towards the support element, in the direction of the span of the convex arch. Thereby, it is ensured that a force introduced into a convex structure of the bottom part, which, without a connection of the convex section to two support elements, would lead to a change of the span, is introduced into the stably designed support elements.

This bottom part structured in the above-described manner can be part of a bottom assembly which can comprise one or more additional parts, for example, a bottom plate delimiting the tub structure on the lower side and/or an outside end piece and/or other parts. At the same time, this bottom part can also be designed in multiple parts and/or extend in each case under at least one subsection of at least one battery module. This makes it possible, for example, that any vehicle platforms can be broadened or completed in a flexible manner without additional tools having to be made available for this purpose.

In smaller battery housings, the tub structure of which is not subdivided by longitudinal and/or transverse struts, the span of the curvature extends in at least one direction—longitudinal or transverse direction of the battery housing—between the mutually facing frame parts. In many cases, due to the size of the battery housing, the tub structure will be subdivided into individual battery module compartments by a separator, typically formed by at least one longitudinal strut and multiple transverse struts extending transversely thereto. These struts also represent support elements. In such a case, the span of the curvature of the bottom part extends between two respective support elements arranged adjacently with respect to one another.

The curvature of the bottom part in the direction of the outside of the battery housing between two support elements arranged adjacently to one another has the effect that the force induced in the bottom part by a bottoming out acting on the curvature is introduced into the support elements delimiting this curved section. For this purpose, the bottom part is connected in a shear and traction resistant manner to the support elements. In addition, the spacing of the bottom part from the battery module(s) due to its arching has the effect that the bottom part can be deformed (pressed in) at least to a certain extent without potential damage to a battery module located above the bottom part. Thus, due to this measure, a certain deformation path is made available at the same time. The consequence is that, in this battery housing, much more energy can be dissipated before there is risk of damage to the battery modules located in the battery housing than in conventional battery housings without such protection. Since, in principle, no additional components are necessary in this battery housing, but instead the desired mechanical protection from the actions of force applied from below is brought about by the structuring of the bottom part and its bracing on the support elements, the bottom part is not significantly more expensive than a conventional unstructured bottom part. This is mainly on the background that such a design makes possible smaller metal plate thicknesses in comparison to conventional housings, whereby crash protection with low weight can be implemented.

In some embodiments, it is provided that the outside of the structured bottom part is stiffened by an end piece. The end piece, which can be connected in the area of the crest of the curvatures of the bottom part to said bottom part, is used for optimizing the aerodynamics and for preventing or reducing noise generation. Such an end piece in addition increases the stiffness of the bottom assembly of the housing part of the battery housing.

To further increase a possible force uptake of forces acting in z direction or else also in x and/or y direction on the battery housing, the bottom part, when it is curved uniaxially in one or more spans of the bottom part, may be provided with stiffening structures in transverse direction with respect to the curvature. Preferably, these stiffening structures extend at least between two support elements, so that an introduced force can be transferred optimally from one support element to the other support element. Here, for example, the stiffening structure can be an undulated stiffening structure. This stiffening structure overlaps the above-described convex curvature between two support elements.

Such a housing part of a battery housing can be produced, with regard to the above-described structure of the components, from steel plate components. Then, the individual components can be connected to one another by laser or spot welding. The described design of the structure of the battery housing can also be implemented with other materials, including also fiber-reinforced plastics.

In an embodiment for designing the bottom part, it is provided that said bottom part has a changing material thickness in the area of the curvatures of the bottom part. Said material thickness is smallest in the area of the crest of the curvatures and increases in the direction of the points of connection to the support elements. In the case of a bottom part produced from steel plate, this material reduction can be implemented by the shaping process for forming the curved segments.

In addition to the aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is described below in reference to an embodiment example in reference to the appended figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
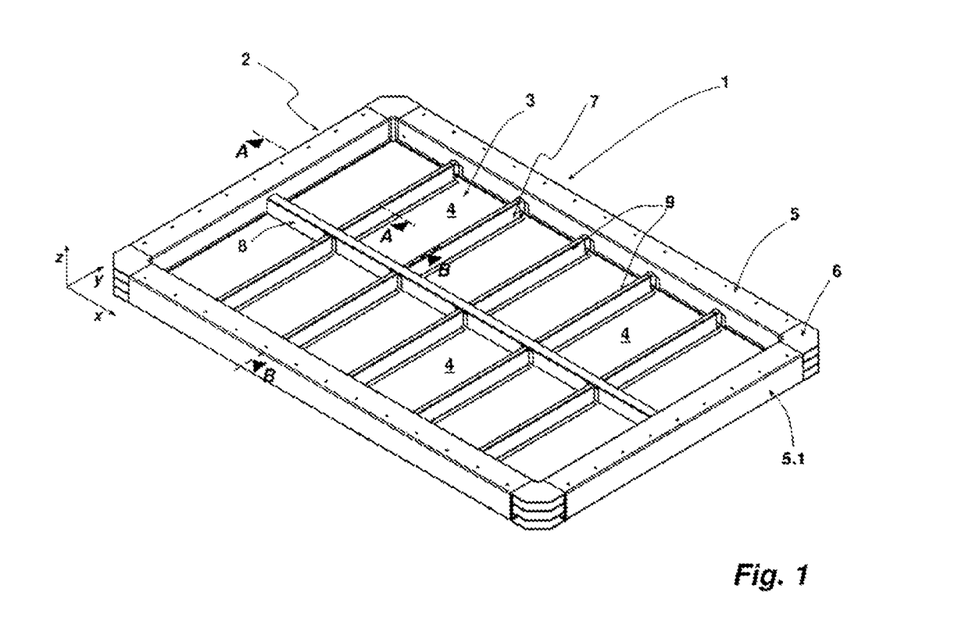
FIG. 1 shows a top perspective view of a housing part of a battery housing with cover removed.

A housing part 1 as part of a battery housing for an electric-motor-driven vehicle comprises a peripheral frame 2 and a bottom assembly 3, the upper bottom plate 4 of which can be seen in FIG. 1. The frame 2 is constructed from several profile segments 5, 5.1, which profile segments 5, 5.1 are connected to one another by corner connectors 6. In the represented embodiment example, the profile segments 5, 5.1 are closed box profiles. A tub structure 7 is formed by the frame 2 and the bottom assembly 3 with its bottom plate 4, which bottom assembly closes the frame opening on the bottom side. A separator formed by a longitudinal strut 8 and transverse struts 9 extending transversely thereto is inserted in the tub structure 7. The longitudinal strut 8 extends between the two mutually facing profile segments 5.1 and is connected to the inner wall of these profile segments 5.1. The transverse struts 9 are connected by one of their ends to the inner wall of the profile segments 5 and by their other end to the longitudinal strut 8. In the represented embodiment example, the above-described elements are steel plate parts which are connected to one another by spot welding. The transverse struts 9 are welded additionally to the bottom plate 4 by connecting flanges beveled on the underside.

Via the separator, several compartments are provided in the tub structure 7, into each of which a battery module can be inserted. The height of the struts 8, 9 is lower than the height of the peripheral frame 2. This makes it possible for cables to be led between the battery modules over the struts 8, 9.

In addition to the housing part 1, the battery housing has a cover, not represented in the figures, which is placed on the upper side shown in FIG. 1, and which is screwed to the frame 2. The closure by the cover part is sealed.

Figure 2:
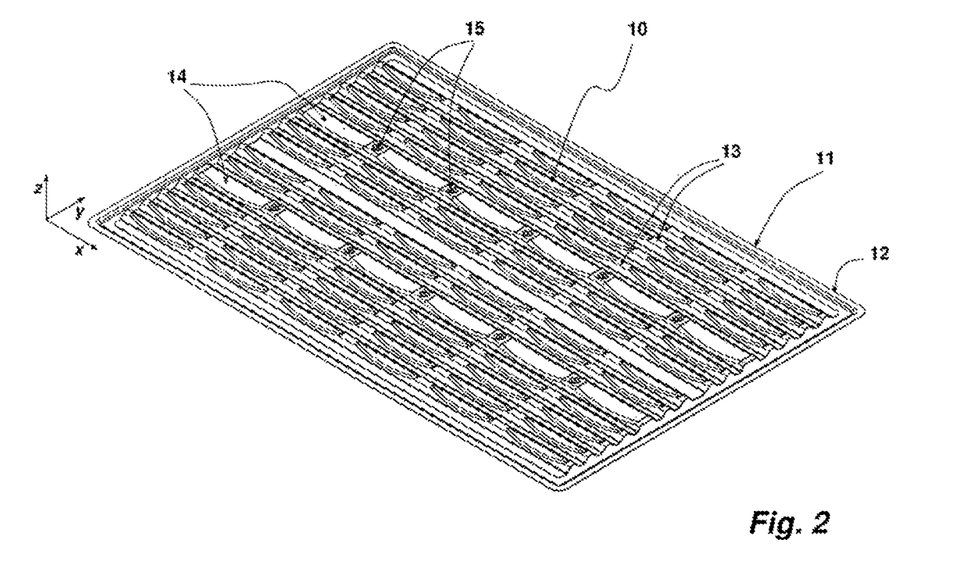
FIG. 2 shows a top perspective view of a bottom part as part of the housing part shown in FIG. 1.

The housing part 1, in its bottom assembly 3, has a reinforcing part 10 as bottom part, in addition to the bottom plate 4. This reinforcing part 10 is shown in a top view in FIG. 2. The bottom plate 4, not shown in FIG. 2, is located above the upper side of the reinforcing part 10. In the represented embodiment example, the bottom assembly 3 moreover comprises an end piece 11. This end piece also has a tub-like design. As can be seen in FIG. 2, the reinforcing part 10 is arranged in said end piece. The end piece 11 is connected to the bottom side of the frame 2 by its peripheral, outwardly protruding flange 12, namely, in the represented embodiment example, by spot welds or gluing. But so that an improved maintenance or an exchange of damaged components can be carried out, a corresponding connection by detachable fastening elements such as screws or rivets, for example, is also possible.

The reinforcing part 10 has been structured in the course of a shaping process, namely in the direction of its longitudinal extent (x direction) and in its transverse direction (y direction). In the x direction, the reinforcing part 10 is convexly curved outward and thus toward the end piece 11, in the span of the reinforcing part between two respective transverse struts 9 as support elements. In alignment with the transverse struts 9, in the structuring, support surfaces 13 are provided, by which two segments of the reinforcing part 10, which are arranged adjacently to one another and curved in x direction, are separated from one another. The support surfaces 13 act against the bottom side of the bottom plate 4 under the transverse struts 9. The reinforcing part 10 is in addition structured in y direction, namely, in the represented embodiment example, by a wave structure which can be seen on the front end face of the reinforcing part 10 in FIG. 2. By this wave structure, the reinforcing part 10 receives additional stiffening. Not shown, but also possible here, is that the convex or wave-shaped structuring is designed in the respective other direction. Also not shown is an embodiment example in which the reinforcing part can also have a modular design. This means that this reinforcing part can also be designed in multiple parts and/or extends in each case under at least one subsection of at least one battery module.

Two connecting webs 14 extend parallel to the profile segments 5, in x direction of the reinforcing part 10. These connecting webs are at the level of the support surfaces 13. Into these support surfaces, fastening openings 15 are introduced arranged spaced from one another, through which screw bolts extend for screwing the reinforcing part 10 with the end piece 11 on the bottom plate 4.

The span of the curvature of the reinforcing part 10 in x direction extends in each case over a compartment of the separator. In the represented embodiment example, in x direction, six battery module receiving compartments are provided. Thus, the reinforcing part 10 in x direction has six areas curved in the above-described manner. With regard to the compartments, the x extent is the shorter extent in comparison to the extent of a compartment in y direction. As a general rule, as the respective shorter extent of such a compartment within a separator, one will select the extent in the direction of which the curvature of the reinforcing part 10 is provided. However, when a monoaxial curvature is provided, it is in principle also possible that the curvature can extend in another direction.

Figure 3:
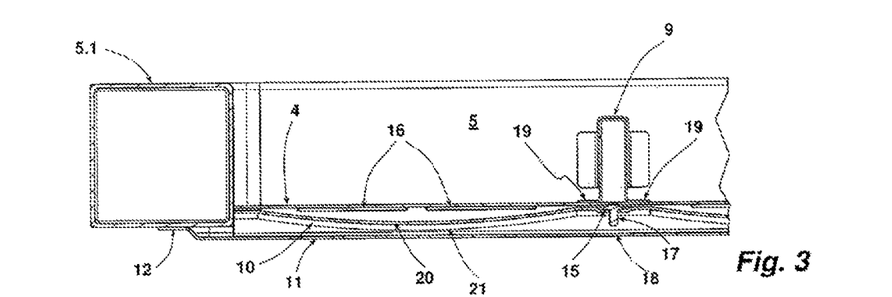
FIG. 3 shows a cross section along line A-A of FIG. 1.

The entire bottom assembly 3 with the reinforcing part 10 used as bottom part can be seen in the cross-sectional representation of FIG. 3. The bottom plate 4 on the bottom side supports cooling panels 16 which are connected to a coolant circuit. The cross section shown in FIG. 3 extends over one compartment of the tub structure 7 in x direction of the housing part 1. This compartment is delimited, on the one hand, by a profile segment 5.1 and, on the other hand, by a transverse strut 9. On the bottom side of the bottom plate 4, under a transverse strut 9, a threaded peg 17 welded to the bottom plate 4 is situated. This threaded peg extends through a fastening opening 15 of the reinforcing part 10. In the end piece 11, in alignment with the threaded peg 17, in each case an opening 18 is situated, through which a nut can be set on the threaded peg 17 and thereby the reinforcing part 10 can be connected in a shear and traction resistant manner to the bottom plate 4. Above the threaded peg 17, a transverse strut 9 is located, which is fastened by the connecting flanges 19 to the upper side of the bottom plate 4. Thus, a force introduction occurs from the reinforcing part 10 via this connection to the bottom plate 4 into the transverse struts 9.

The outwardly directed convex curvature of the reinforcing part 10 can be clearly seen in FIG. 3. Therein, the curvature is identified with reference numeral 20. The cross section shown in FIG. 3 moreover shows the nearest crest 21 of the transverse undulation which follows the curvature 20. The introduced transverse undulation, the waves of which extend in x direction and are arranged adjacently in y direction, contributes, by the introduced stiffening structure, to a significant improvement of the crash performance of the entire battery housing in x direction. This results primarily from the fact that, due to the introduced wave structure, the distance between longitudinal supports 8 and profile segments 5, which is greater than the transverse support spacings, can be compensated. Moreover, in comparison to conventional housings, any penetration depths can thereby be reduced by more than 50%.

The reinforcing part 10 adjoins by its end face, which can be seen in FIG. 2, the inner wall of the profile segment 5.1. No additional fastening to the bottom plate 4 is necessary here. It is sufficient for the end piece 11 connected to the reinforcing part 10 to be connected by its flange 12 to the bottom side of the profile segment 5.1.

Figure 4:
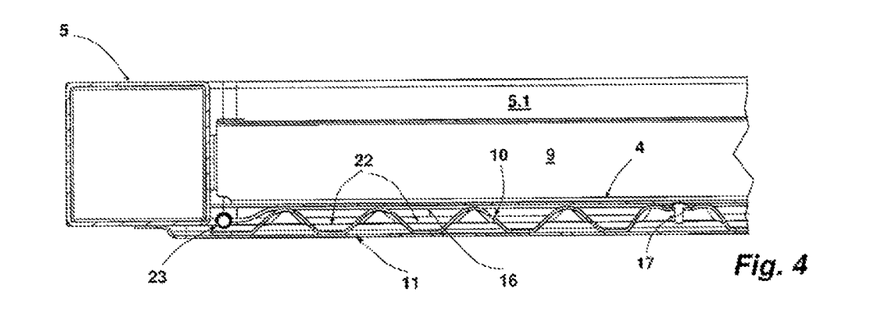
FIG. 4 shows a cross section along line B-B of FIG. 1.

FIG. 4 shows a cross section through a housing part 1 for representing the undulation in y direction of the reinforcing part 10. The reinforcing part 10 is welded by the bottom side of its flattened wave troughs 22 which can be seen in FIG. 4 to the end piece 11. The cooling panels 16 are connected to collectors, one collector 23 of which can be seen in cross section in FIG. 4.

Figure 5:
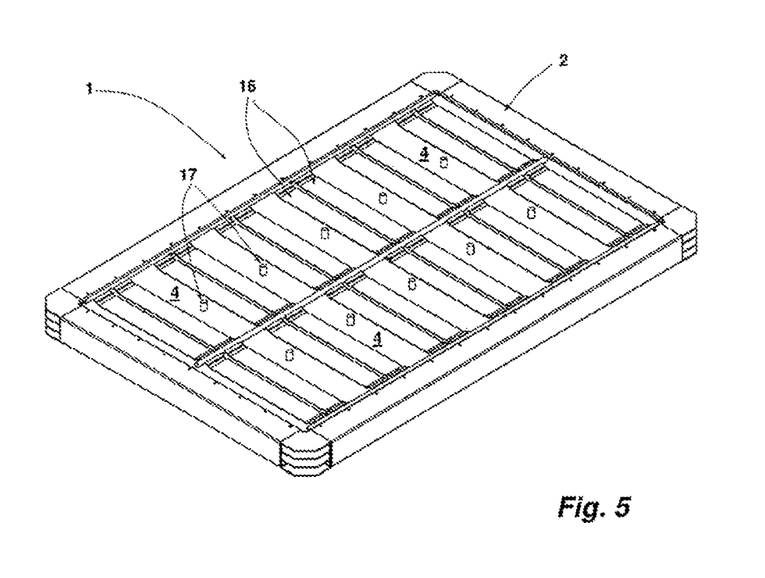
FIG. 5 shows a bottom perspective view of the housing part of FIG. 1 with bottom part removed.

FIG. 5 shows the housing part 1 in a perspective view from below onto the bottom plate 4 with its cooling panels 16, namely without reinforcing part 10 and end piece 11. The threaded pegs 17 protruding from the bottom plate 4 can be seen, threaded pegs on which the reinforcing part 10 together with the end piece 11 is fastened on the bottom plate side.

Figure 6:
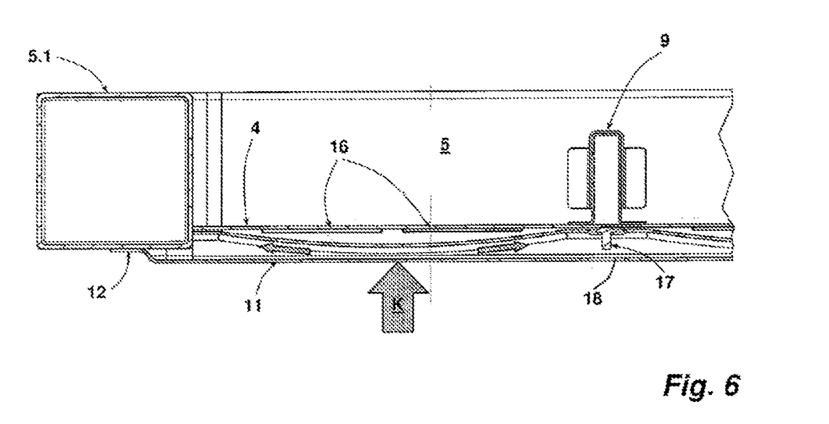
FIG. 6 shows a representation corresponding to the representation of FIG. 3 for representing an action of a force from outside onto the bottom assembly.

By the bottom assembly 3 of the housing part 1 and in particular its reinforcing part 10, a relatively large amount of energy can be absorbed before the reinforcing part 10 reaches the cooling panels 16 or the bottom plate 4 is actually pressed in. If the housing part 1, as battery housing, closed with a cover is located under the bottom assembly of a motor vehicle, such a force action can be the result of a bottom-side bottoming out. As indicated by the block arrow in FIG. 6, this force acts on the bottom assembly 3 and first onto the convex crest of the curvature 20. Due to the outwardly directed convex curvature between two support elements (in FIG. 3, the profile segment 5.1 and the transverse struts 9), between which the span of the curvature 20 extends, the force acting on the crest of the curvature 20 is introduced into the support elements 5.1, 9 which are already stable and which, in addition to being stable in the z direction, are also stable in the x-y direction (indicated by block arrows) with respect to a force uptake. This occurs on the profile segment 5.1 via the end face of the stiffening part 10 in contact with the wall of the profile segment 5.1 pointing into the tub structure 7 and in the area of the transverse strut 9 via the above-described screw connection on the threaded pegs 17. This design uses the transfer of the force, which occurs as a result of the curvature, into the transverse supports, said force acting in z direction. The distance of the reinforcing part 10 in this area from the bottom side of the bottom plate 4 and thus from the battery modules located on the upper side, due to the provided deformation path, enables the uptake of a large amount of energy before the curvature 20 is deformed and the cooling panels 16 have been pressed on. In general, it can be noted that the stiffness is lowest at the crest point of the curvature and increases in the direction of the transverse support 9, whereas the behavior of the bending moment is opposite thereto. As a result of this, at the largest expected bending moment, the maximum deformation path is made available to the crest point of the curvature. Here, in combination with the bending moment which decreases toward the transverse supports 9 and the simultaneous increase in the stiffness, the introduction of the occurring forces into the transverse supports 9 is ensured. To that extent, in this design, in contrast to previously known battery housings, a certain deformation path in the direction of the height/thickness and thus in z direction of the battery housing is allowed.

Figure 7:
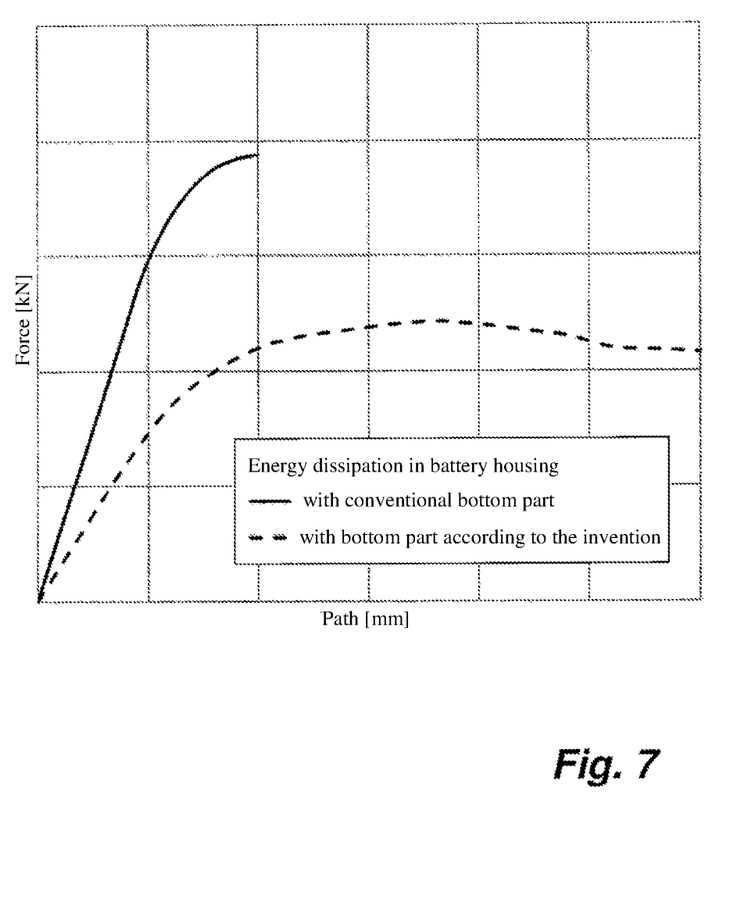
FIG. 7 shows a force-path diagram for representing the energy dissipation with a battery housing with the housing part of the embodiment example represented in the figures in a comparison with a conventional battery housing.

In a juxaposition, the diagram shown in FIG. 7 shows the energy dissipation in a battery housing with a housing part 1 according to the present disclosure (dashed line) compared with the energy dissipation in a battery housing with a conventional bottom part (solid line) and thus without a reinforcing part 10 according to the present disclosure. The energy dissipation represented relates to action of a force from below onto the bottom assembly, as shown diagrammatically in FIG. 6.

A conventional battery housing, due to its stiffening designed for a particular stiffness, can in fact take up a higher force over a short distance. However, if this path is exceeded, there is a risk of damage to or destruction of the battery modules. The decisive factor is not the highest possible force magnitude, but the amount of energy dissipation, which is essential for the protection of the battery modules contained in a battery housing. In the curves shown in FIG. 7, the dissipated amount of energy is the area located under the respective curve. Due to the design of the battery housing according to the present disclosure, with its deformation path produced by the reinforcing part 10, which the curvature 20 can travel with simultaneous energy dissipation, a much larger amount of energy can be dissipated before the cooling panels and/or the battery modules are affected. The area under the curve showing the energy dissipation with the bottom part according to the present disclosure is more than twice as large as the area under the curve representing the energy dissipation with a conventional bottom part. Accordingly, in the case of the battery module according to the present disclosure, more energy can be taken up by its housing part 1 without destruction with regard to the cooling panels contained therein and in particular the battery modules.

The above is the result of the skillful combination of the provision of an energy dissipation path via the deformation in collaboration with the force uptake made available in the housing part via the support elements. From the description of the embodiment example, it can be seen that the significant increase of the energy which can be taken up, without destruction of the battery module and the cooling panels, can be brought about without significant weight increase due to particularly stable or expensive components.

The invention has been described in reference to embodiment examples. Without leaving the scope of the valid claims, numerous additional possibilities arise for a person skilled in the art for implementing the invention within the scope of the valid claims, without said possibilities having to be presented in detail in the context of this explanation. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Housing part
2 Frame
3 Bottom assembly
4 Bottom plate
5, 5.1 Profile segment
6 Corner connector
7 Tub structure
8 Longitudinal strut
9 Transverse strut
10 Reinforcing part
11 End piece
12 Flange
13 Support surface
14 Connecting web
15 Fastening opening
16 Cooling panels
17 Threaded peg
18 Opening
19 Connecting flange
20 Curvature
21 Crest
22 Wave trough
23 Collector

The invention claimed is:

1. A housing part of a battery housing for an electric-motor-driven vehicle, the housing part forming a tub structure, the housing part comprising:
   multiple support elements arranged at a distance from each other, wherein battery modules to be arranged in the housing part are to be arranged between the support elements, and
   a bottom part supported on the support elements, wherein the bottom part is convexly curved toward an outside of the housing part in the longitudinal or transverse extent in a span of the bottom part between two respective adjacent support elements arranged at a distance from each other,
   wherein the bottom part is connected in the direction of the curvature to the support elements between which the span extends,
   wherein the distance from the bottom part to a battery module to be arranged between two support elements is increased by the convex curvature of the bottom part.

2. The housing part of claim 1, wherein the support elements are designed as profiles.

3. The housing part of claim 1, wherein the support elements are frame parts with respect to the tub structure of the housing part.

4. The housing part of claim 3, wherein the support elements include one or more longitudinal and/or transverse struts connected to the frame parts, the one or more longitudinal and/or transverse struts are inserted as additional support elements in the tub structure, and the bottom part in each case is convexly curved toward the outside of the housing in the span of the bottom part between two adjacent support elements.

5. The housing part of claim 1, wherein the bottom part is curved uniaxially in the span of the bottom part between two support elements and comprises stiffening structures in transverse direction with respect to the direction of curvature.

6. The housing part of claim 5, wherein the transverse structuring has an undulated design.

7. The housing part of claim 5, wherein the stiffening structures extend at least between two support elements.

8. The housing part of claim 1, wherein the span of the bottom part between two adjacent support elements transitions into a connection section by which the bottom part is connected to the respective support element.

9. The housing part of claim 1, wherein the bottom part is a shaped steel plate component or aluminum component.

10. The housing part of claim 1, wherein the side of the bottom part facing away from the support elements is stiffened by an end piece.

11. The housing part of claim 10, wherein the end piece is a steel plate part or an aluminum plate part.

12. The housing part of claim 1, wherein the bottom part under a bottom plate is part of a floor assembly.

13. The housing part of claim 12, wherein the bottom plate on the bottom side thereof supports cooling panels.

14. The housing part of claim 1, wherein the bottom part is designed in multiple parts and/or extends in each case under at least a subsection of at least one battery module.

* * * * *